Figure 5:
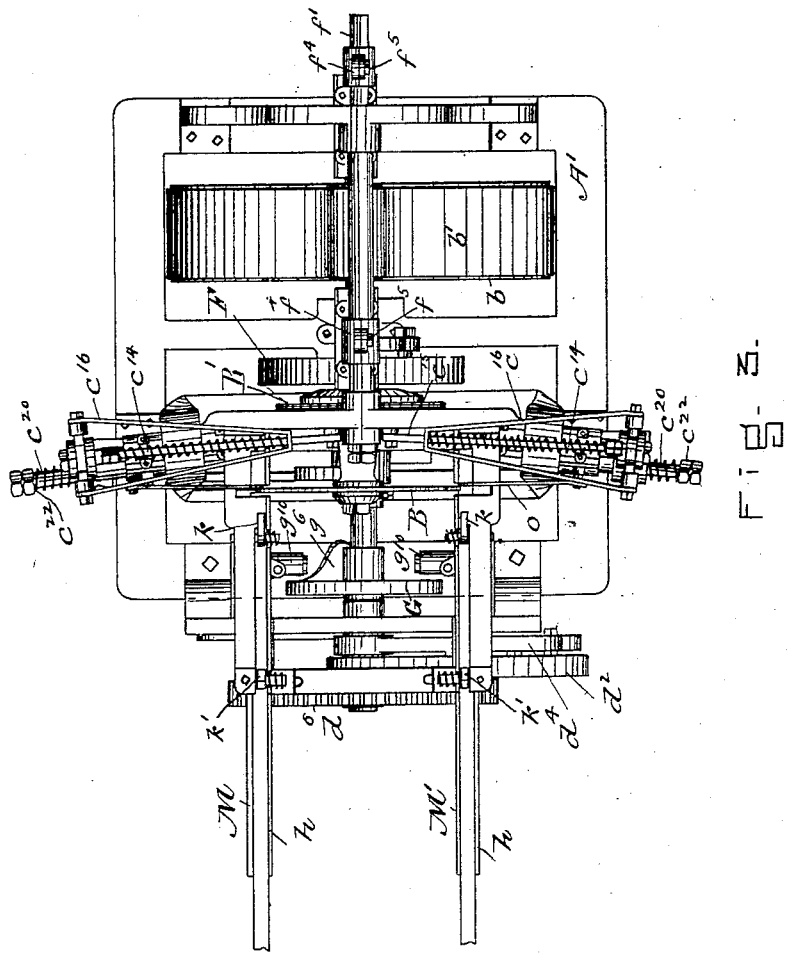
Figure 5:
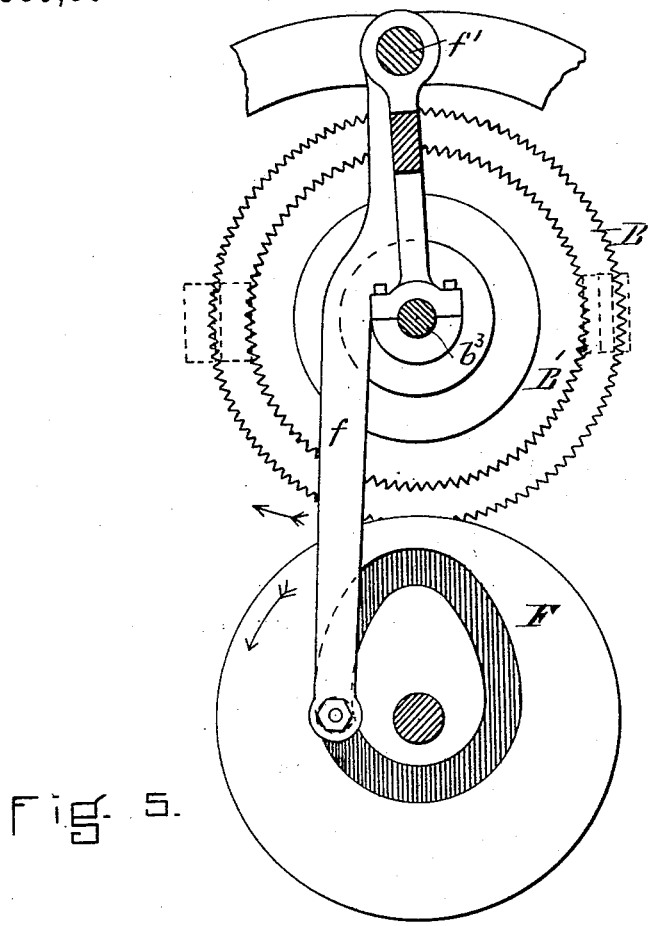

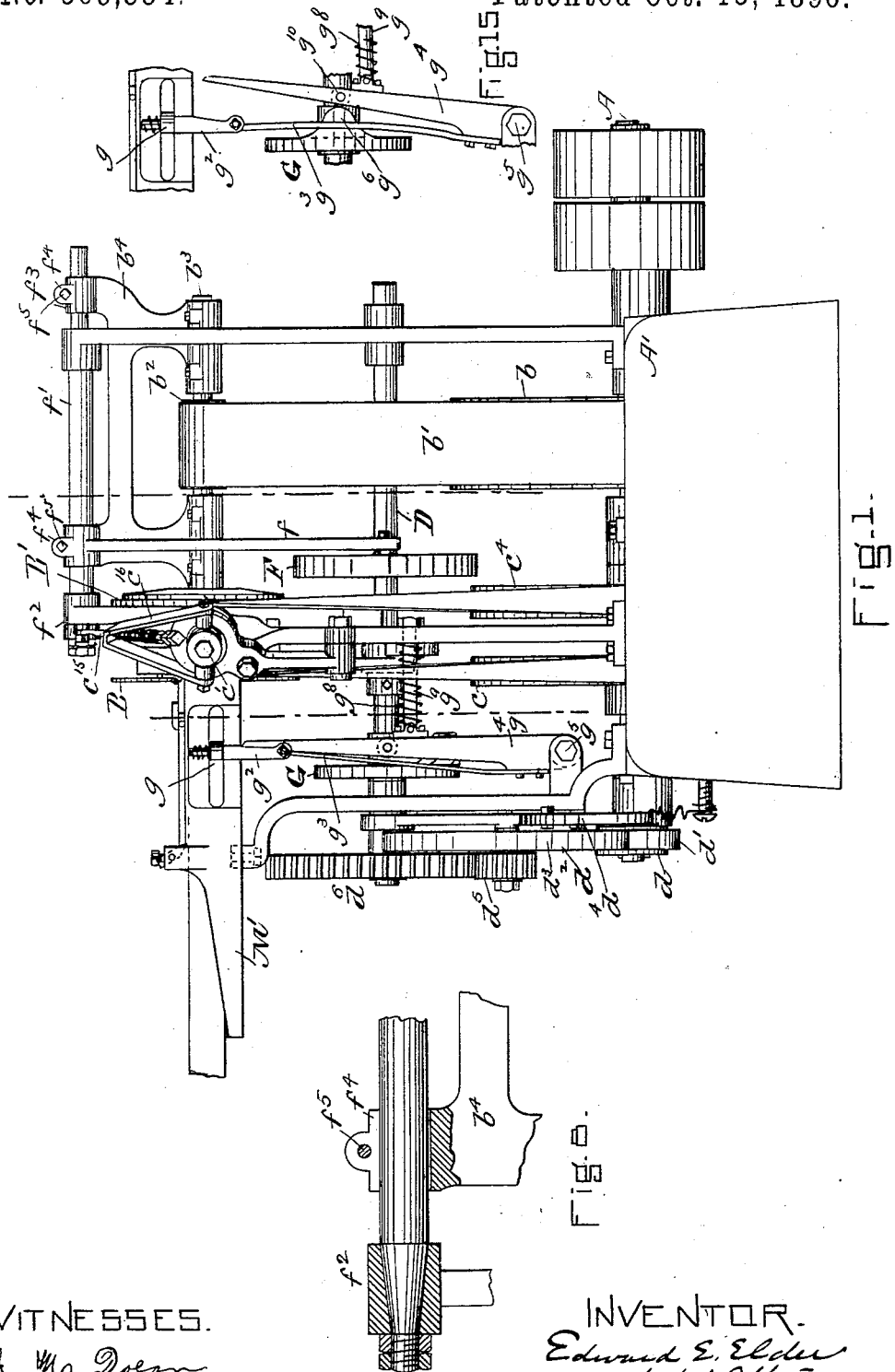

(No Model.) 6 Sheets—Sheet 2.
E. E. ELDER.
MACHINE FOR MAKING BUNGS, &c.
No. 569,554. Patented Oct. 13, 1896.
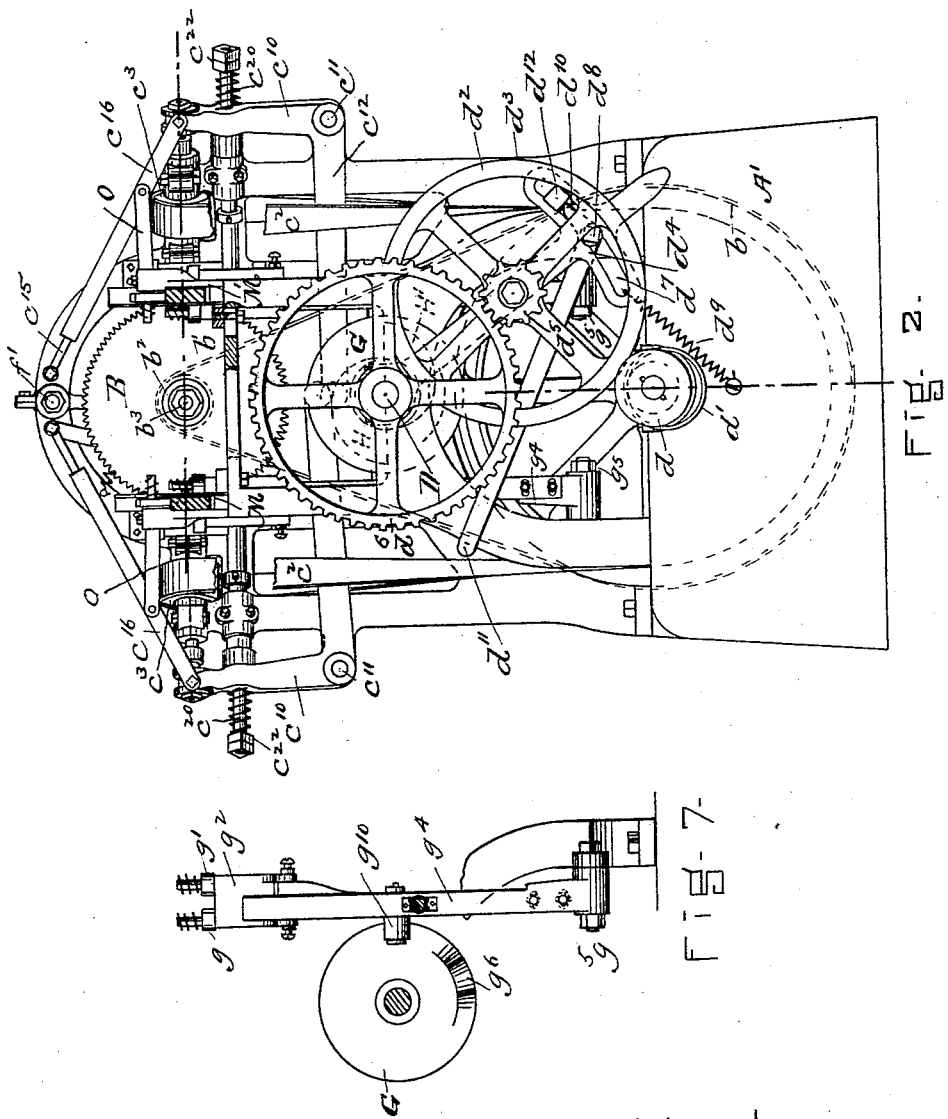
WITNESSES. INVENTOR.
J. M. Dolan. Edward E. Elder
M. M. Teague. by his atty's
Clarke & Raymond (No Model.) 6 Sheets—Sheet 3.

E. E. ELDER.
MACHINE FOR MAKING BUNGS, &c.

No. 569,554. Patented Oct. 13, 1896.

WITNESSES.
J. M. Dolon
M. M: Fague

INVENTOR.
Edward E. Elder
by his Attys
Clarke & Raymond (No Model.) 6 Sheets—Sheet 4.
E. E. ELDER.
MACHINE FOR MAKING BUNGS, &c.
No. 569,554. Patented Oct. 13, 1896.
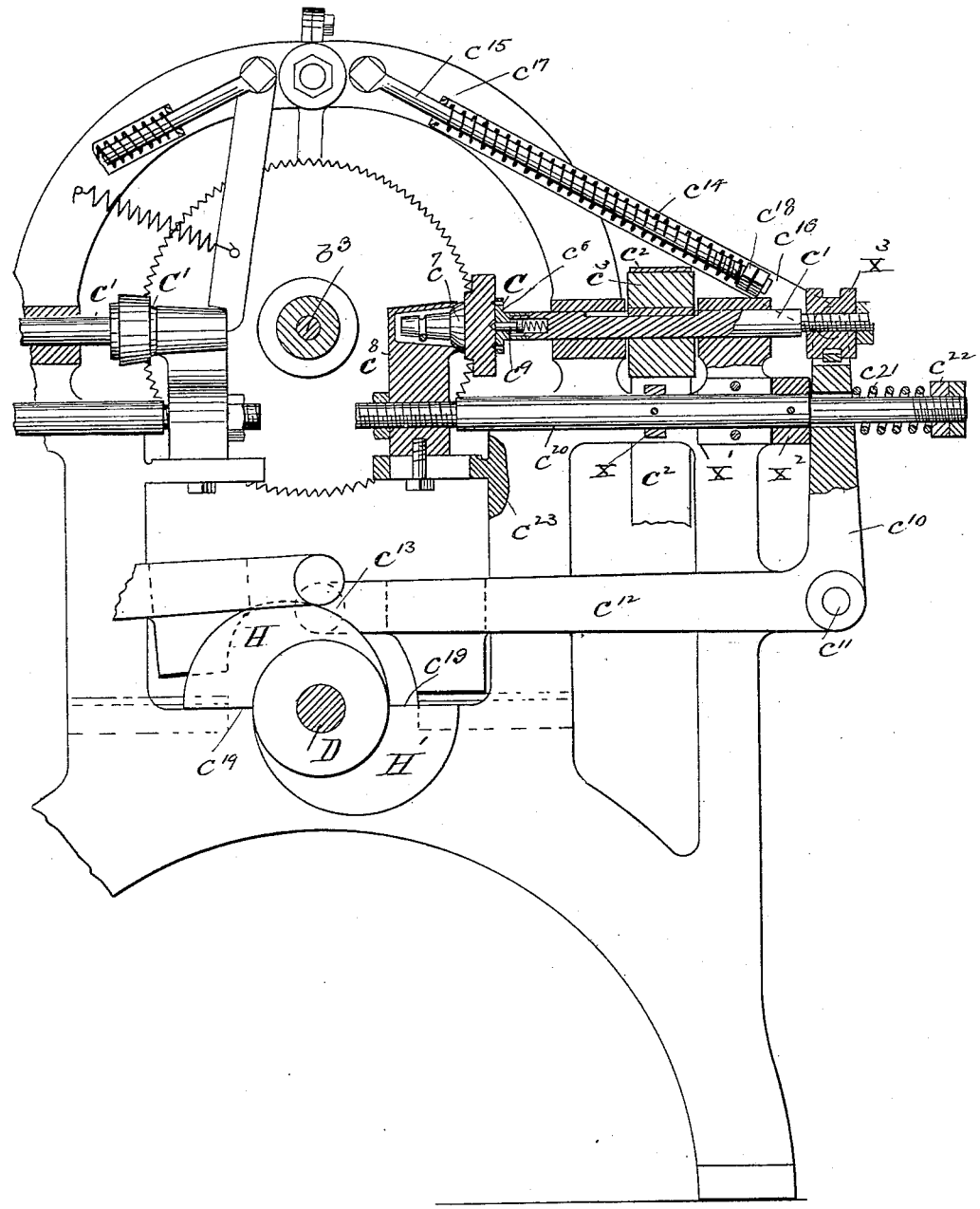
WITNESSES. Fig-4. INVENTOR.

(No Model.) 6 Sheets—Sheet 5.

E. E. ELDER.
MACHINE FOR MAKING BUNGS, &c.

No. 569,554. Patented Oct. 13, 1896.

WITNESSES.
J. M. Dolan
M. McFague

INVENTOR.
Edward E. Elder
by his Attys
Clarke & Raymond (No Model.) 6 Sheets—Sheet 6.

E. E. ELDER.
MACHINE FOR MAKING BUNGS, &c.

No. 569,554. Patented Oct. 13, 1896.

WITNESSES.
J. M. Dolan
M. McFague

INVENTOR.
Edward E. Elder
by his Atty's
Clarke & Raymond

UNITED STATES PATENT OFFICE.

EDWARD E. ELDER, OF LYNN, MASSACHUSETTS, ASSIGNOR TO THE ELDER MANUFACTURING COMPANY, OF PORTLAND, MAINE, AND LYNN, MASSACHUSETTS.

MACHINE FOR MAKING BUNGS, &c.

SPECIFICATION forming part of Letters Patent No. 569,554, dated October 13, 1896.

Application filed October 26, 1891. Serial No. 409,818. (No model.)

*To all whom it may concern:*

Be it known that I, EDWARD E. ELDER, a citizen of the United States, residing at Lynn, in the county of Essex and State of Massachusetts, have invented a new and useful Improvement in Machines for Making Bungs and Similar Articles, of which the following is a full, clear, and exact description, reference being had to the accompanying drawings, forming a part of this specification, in explaining its nature.

The invention relates to a machine for producing bungs and similar articles; and it comprises, briefly speaking, a shaft upon which is mounted a cutting-saw for severing bung-blanks from a suitable strip or strips and one or more saws or turning devices for operating upon the edges of the blanks and suitably shaping the same into a completed bung, the cutting-saw and turning devices and their shaft being mounted upon a hanger and preferably being arranged between two feed or raceways, which are represented as horizontally arranged and in which the blank-strips are fed to the action of the cutting-saw and finishing device.

The invention further relates to the provision, in connection with such cutting-saw and finishing devices and the described raceways, of strip-feeding devices for each raceway and devices for presenting the cut blanks to rotary chucks or holders and for removing the finished bungs therefrom.

The invention further relates to various details of organization and construction, all of which will hereinafter be described.

While I have represented the invention as applied to a machine having two raceways whereby a blank is cut and a finished bung is produced therefrom at each movement of the cutting-saw and turning or finishing devices, I would say that it may be used with only one raceway, but I prefer two, as it gives the machine substantially double the capacity which one alone would have.

Figure 6:
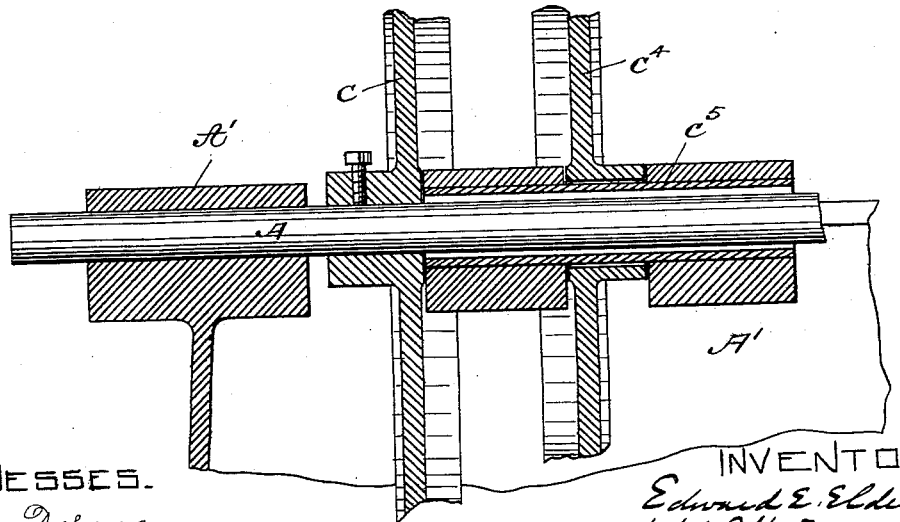
Figure 9:
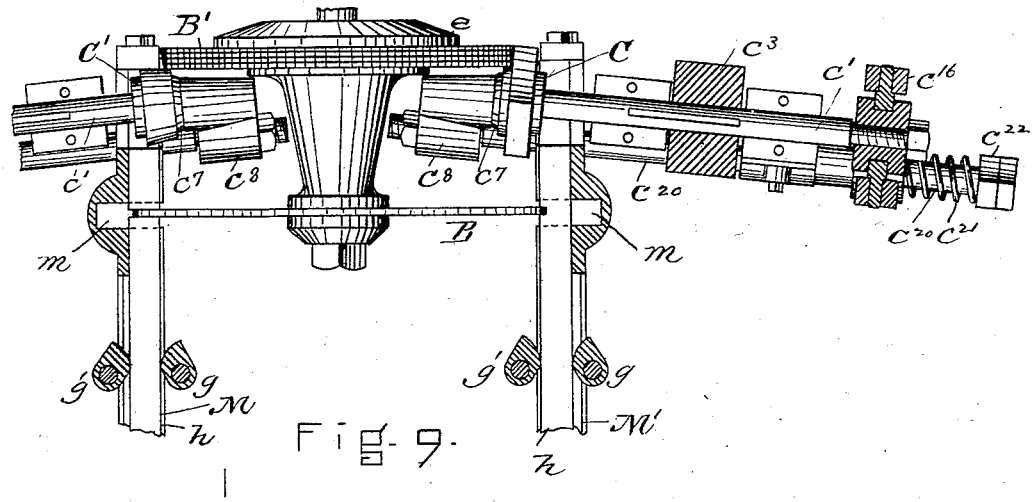
Figure 10:
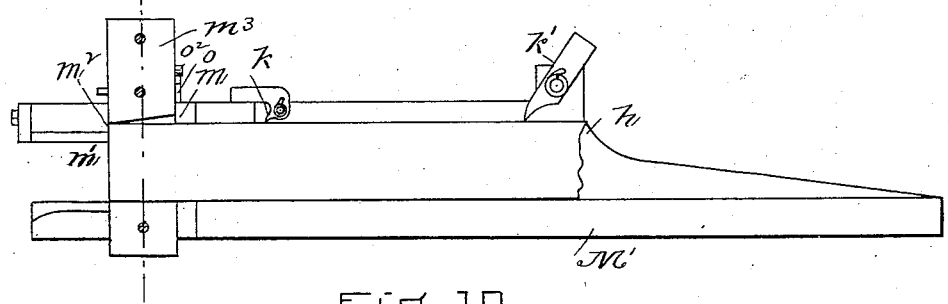
Figures 11, 12, 16:
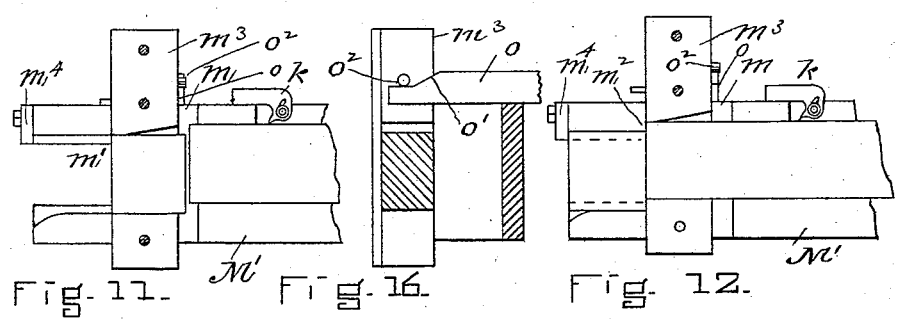
Figure 13:
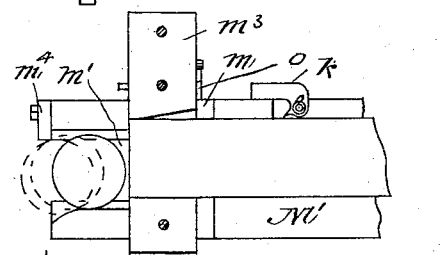
Figure 14:
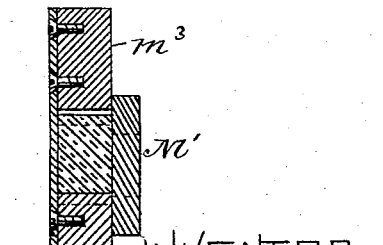

Referring to the drawings, Figure 1 is a view in side elevation of a machine having the features of the invention. Fig. 2 is a view principally in front elevation thereof. Fig. 3 is a plan view of the machine. Fig. 4 is a detail view enlarged, principally in vertical section, to show especially the manner in which the chuck operates to hold and present the blank. Fig. 5 is a detail view showing the mechanism for oscillating the hanger and shaft supporting the cutting-saw and turning saws or devices. Fig. 6 is a detail view in section to show a portion of the mechanism for driving the chuck-shafts. Fig. 7 is an enlarged detail view, principally in elevation, of a portion of a strip-feeding mechanism. Fig. 8 is an enlarged detail view of one of the bearings of the saws-hanger. Fig. 9 is a detail view enlarged in horizontal section and plan to better show the relation between the cutting-saw and the finishing saws or devices and the raceway and chucks. Fig. 10 is a view in elevation in detail of a portion of a raceway. Figs. 11, 12, 13, 14, and 16 are detail views to illustrate in connection with Fig. 10 the manner of presenting the bung-blanks to the rotary chuck or holder. Fig. 15 is a view in detail to illustrate a portion of the blank-strip-feeding mechanism.

The main shaft A of the machine extends lengthwise of the same and has suitable bearings in the frame A' thereof. It carries a band-wheel $b$, which is connected by a belt $b'$ with a small pulley $b^2$ on the shaft $b^3$, as shown in Figs. 1, 2, and 3. This shaft has suitable bearings in the hanger $b^4$ and carries at its forward end the blank-cutting saw B and the blank-edge turning or finishing saws or devices B'. This shaft and the saws are constantly rotated. The hanger is so suspended that it may have an oscillating or swinging movement to move the saws toward and from the work or raceways, as will be hereinafter explained. The main shaft A carries also a band-wheel $c$ for rotating the shafts $c'$ of the chucks C C'. This is accomplished by means of a belt $c^2$, which passes over the band-wheel $c$, over the pulley $c^3$ on each of the shafts $c'$, and about the free or idler band-wheel $c^4$. This idler band-wheel $c^4$ is represented as having a bearing upon a tubular shaft or sleeve $c^5$, (see Fig. 6,) supported at each end by the frame, and through which the main shaft A extends. I am thus enabled by a single belt and positively-rotated band-wheel to rotate the shafts of each chuck.

The main shaft A may be connected with the cam-shaft D by means of positive gearing, but preferably by means of an equivalent connecting device, organized, however, not to operate positively, or, in other words, so organized as to cease to transmit the power of the machine in case of accident or for any other reason. This connection is represented in Figs. 1 and 2. At the forward end of the main shaft is a smooth-surfaced flanged roll $d$, in which is a loose leather ring $d'$. A wheel $d^2$, having a smooth edge or periphery $d^3$, is supported upon a hanger or support $d^4$ in a manner to permit it to be moved into or out of contact with the leather ring $d'$, and a rotary motion is communicated to this wheel by the roll $d$ and the leather ring when it is moved and held somewhat forcibly against the same. The wheel $d^2$ has a pinion $d^5$, which meshes with the gear $d^6$ upon the shaft D, as shown in Figs. 1 and 2. To rotate the cam-shaft, the wheel $d^2$ is moved into contact with the roll $d$. The hanger $d^4$ is hung at its upper end on the cam-shaft D, the wheel is journaled in the hanger about midway its length, and the lower end of the hanger is extended laterally to provide wings for a slot $d^7$, by which and a headed steady-pin $d^8$ the lower end of the hanger is held in place and permitted to swing. A spring $d^9$ serves to draw the hanger obliquely downward and the wheel $d^2$ into forcible contact with the roll $d$. The hanger is moved upward to remove the wheel $d^2$ from the roll $d$ and held in its removed position by means of a cam-latch $d^{10}$, pivoted on the stud $d^8$, having the long operating-handle $d^{11}$ and acting against a projection $d^{12}$. This projection preferably is adjustably secured in the slot $d^7$ of the hanger.

The cam-shaft D carries a cam F for oscillating the hanger $b^4$, the saw B, and the edge-turning devices B'. This oscillating movement is communicated to the hanger by means of a lever or arm $f$, (see Fig. 5,) attached at its upper end to the hanger and bearing at its lower end a cam-roll entering the cam-groove of the cam. The hanger is carried upon a horizontal shaft or long pivot $f'$, which has bearings at $f^2$ $f^3$ in the frame, the pivot turning in its bearings and the hanger being clamped to the pivot by means of a split bearing or box $f^4$ and a clamping bolt or screw $f^5$, Figs. 1 and 3. By thus attaching the hanger to the pivot or shaft I am enabled to adjust it, together with the devices it carries, longitudinally in relation to the raceway and chucks. The shaft D also carries the cam G for operating the feed-dogs and the cams H H' for operating the chucks. (See Fig. 4.) Before describing the connections between these cams and the things they actuate I will briefly describe the raceways and the position which they occupy in relation to the blank-cutting saw and the blank-turning devices or saws.

As seen in Figs. 1, 3, 9, 10, 11, 12, 13, 14, and 16, M M' are the raceways. They are parallel with each other, are horizontal, and are separated from each other by a space a little more than equal to the diameter of the cutting and finishing saws, which are arranged between them at their inner ends. Each raceway has a rectangular passage $h$, Figs. 3 and 9, through which the bung-blank-forming strip is fed.

The strip-feeding mechanism is represented as consisting of two feed-dogs $g$ $g'$ of usual form, carried by a holder $g^2$, one upon each side of the feedway, to project through slots therein, the dogs being so shaped as to engage the strip upon the forward movement of the holder $g^2$ and to ride upon the strip upon its backward movement. The holder $g^2$ is attached to the upper end of a quite powerful spring $g^3$, which is secured at its lower end to a lever $g^4$, which has movement upon a pivot $g^5$.

It will be understood, of course, that each raceway has its separate feeding-dogs, but the cam G serves to operate both in alternate or successive order. This is accomplished by so arranging the levers $g^4$ that their cam-pins $g^{10}$ come into line with the cam projection $g^6$ upon the cam G. (See Fig. 7.) A coil-spring $g^8$ about the steady-rod $g^9$, Fig. 1, pivoted to the lever and extending through a hole in an upright of the frame, serves to maintain the cam-roll in contact with the cam projection $g^6$, Fig. 15, and in the operation of this part of the device the cam projection coming in contact with the cam-roll causes the upper end of the lever $g^4$ to be moved, and also operates the feed-dogs and their holder $g^2$, and unless there should be some obstacle to prevent the feeding of the strip the holder $g^2$ is moved as though positively attached to the lever; but in case there is any obstacle to prevent the movement of a blank-strip then while the lever $g^4$ is positively moved the feed-dogs and their holder are not moved any further than the strip will permit them to be moved, the spring connection $g^8$ permitting them to assume a stationary position during the continued movement of the lever. This prevents damage to the machine in case of accident or any irregular action. The strips are held in the raceways by detents $k$ $k'$, Figs. 10, 11, 12, and 13, which bear upon the upper edge of the strip, hold it down in the raceway, and also hold it against any backward action of the feed-dogs upon the strip. There is across the feedway near each end a recess $m$, Figs. 9 and 13, into which the cutting-saw enters sufficiently to sever a blank from the end of the strip. By their engagement with the strips the feed-dogs act as they turn upon their pivots not only to feed the blank-strips to the cutting-saw, but also to remove the finished bungs from the chucks and a previously-sawed blank to a position to be seized by the chucks. There is always, therefore, a sawed blank in that section of the feedway in advance of the recess $m$, that is, between the end of the strip and the chuck. In order that the size of the blank may be determined, it is necessary that the strip should be moved by the feed-dogs first against an end stop, and it is also necessary, after the blank has been severed, that it be removed from contact with the stop in order that it may be moved forward upon the next feeding movement of the strip, first to dislodge the finished bungs, and, second, to take its place in the chuck. To accomplish this, the raceway is slightly dropped or arranged upon a slightly lower level or lower section $m'$. This provides a stop $m^2$, against which the end of the strip is fed by the feed-dogs. (See Fig. 10.) After the cutting-saw has operated to sever a blank from the end of the strip the blank is moved downward by the transferrer $m^3$ into the lower section $m'$ of the race or to the position shown in Fig. 11. The chuck having returned to its original position with a finished bung, the strip is again fed forward, comes into contact with the stop $m^2$, and pushes the cut blank upon the finished bung, dislodging it from the chuck and causing the cut blank to take the place of the bung between the face-plates of the chuck, the blank being pushed against the rear stop $m^4$. (See Fig. 12.) The transferrer $m^3$ is operated as hereinafter specified.

Each of the chucks C C' has a face-plate or head-stock $c^6$, carried at the inner end of its operative shaft $c'$, and the tail-stock or face-plate $c^7$, carried by a head or block $c^8$, in which it is adapted to be rotated. The face-plate also has a spring-operated clearer $c^9$, Fig. 4, for forcing the finished bung from the face-plate. In operation the bung-blank is moved between the two face-plates, they being then in a position to receive it at the end of the raceway, and they are so supported and actuated that, having received the blank, the face-plate is then moved against the blank to press it upon the plate $c^7$, and the chuck is then moved sufficiently to move the blank into operative relation to the edge-turning saws or devices. To so operate the chuck or its face-plates, there is attached to the outer end of the shaft $c'$ a bent lever $c^{10}$, Fig. 4. This bent lever is movable upon a pivot $c^{11}$, and its horizontal arm $c^{12}$ extends inwardly and carries a cam-roll $c^{13}$, which bears upon the edge-cam H. This cam is shaped first to hold the face-plate $c^6$ open or away from the face-plate $c^7$, and it acts in opposition to the spring $c^{14}$. This spring is carried upon a rod $c^{15}$ and is connected with the upper end of the vertical portion of the lever $c^{10}$ by a yoke-piece $c^{16}$, Fig. 9, the spring bearing against the upper end $c^{17}$ of the yoke and the nut $c^{18}$ at the lower end of the rod. After the blank has been fed into position between the face-plates the cam H revolving permits the cam-roll to ride off its radial surface $c^{19}$, and this permits the spring $c^{14}$ to move the face-plate $c^6$ into contact with the bung-blank to force the bung-blank against the plate $c^7$ and to move them both laterally in relation to the raceway a sufficient distance to remove the blank from the raceway into operative relation with the edge-trimming devices. The head $c^8$, supporting the rear plate, is connected with the lever $c^{10}$ by means of a slide-rod $c^{20}$ and a spring $c^{21}$, arranged between the lever and a nut $c^{22}$ on the outer end of the rod. The head $c^8$ is free to slide a limited distance on the support $c^{23}$. It will be understood, of course, that the chucks are substantially alike and that they are successively operated, the one by the cam H and the other by the cam H'. To actuate the blank-transferrer $m^3$, Figs. 10, 11, 12, 13, and 16, I employ a bar $o$, Figs. 2 and 3, represented as attached to the yoke $c^{16}$. This bar has an incline $o'$ upon its upper edge, which operates, when it is moved in one direction upon a stud $o^2$, secured to the transferrer $m^3$, to lift the latter to the position represented in Fig. 2, that is, when the chucks are separated and in a position to receive the severed blank, and which bar $o$, upon being removed from contact with the stud $o^2$, permits the transferrer to fall or drop, carrying with it the severed blank to the position represented in Fig. 11.

The operation of the machine is as follows: The blank-strips are fed into the raceways and are advanced by the feed-dogs in successive order to the severing-saws and severed blanks are successively advanced by the uncut strip at the same time to the chucks and alternately operated upon by the edge-finishing devices. I prefer to use for an edge-trimming device a series of circular saws varying slightly in diameter from the outer one, which is the smallest, to the inner or largest one, and I also support said saws by means of a rigid backing-plate $e$. The chucks and chuck-holders are represented as having a slight angle in relation to the edge-finishing devices sufficient to provide the bungs with a tapered edge, but it will be understood, of course, that the chucks and their holders may bear any desired relation to the finishing devices for the purpose of varying the bevel or even forming straight-edged or unbeveled bungs.

It will be observed that a collar X encircles the slide-rod $c^{20}$ at about the mid-length thereof, connects the lever $c^{10}$ with the chuck-slide $c^8$, and comes into contact with the end X' of the box in which the rod slides at the end of its forward movement. This stops the movement of the slide $c^8$ and of the face-plate $c^7$, the face-plate then being in line with the inner side of the raceway. The continued outward movement of the lever $c^{10}$ then compresses the spring $c^{21}$ and moves the other face-plate $c^6$ past the outer side of the raceway, so that there is then a space of sufficient width between the two plates, or, more properly speaking, between the end of the throw-off $c^9$, Fig. 4, and the plate $c^7$, for receiving the bung-blank. Upon the reverse movement of the chuck the rod $c^{20}$, by the action of the lever $c^{10}$ and the spring $c^{21}$, is moved in a reverse direction, actuating the slide $c^8$ and the face-plate $c^7$ of the chuck. Movement, however, is not communicated to the slide $c^8$ and the face-plate until the lever $c^{10}$ is very nearly brought into contact with the collar $X^2$, fast to the rod $c^{20}$, the spring $c^{21}$ holding the slide and face-plate for an instant or sufficiently long to permit the spindle or throw-off $c^9$ to move the bung-blank against it and the face-plate $c^6$. The throw-off $c^9$ and face-plate $c^7$ then move together toward the edge-turning devices until the stop or collar $X^2$ comes into contact with the front face of the bearing $X'$, when the face-plate becomes stationary, and a slight continued movement of the lever $c^{10}$ and face-plate $c^6$ forces the prongs of the plate $c^6$ into the bung-blank.

The chuck is made adjustable to meet the wear of the turning-saws in the following way: The rod $c^{20}$ screws into the slide $c^8$, and this gives the slide $c^8$ a horizontal adjustment in relation to stops or collars $X$ $X^2$, which of course varies the position of the spaces in which the face-plate $c^7$ moves. The face-plate $c^6$ is adjusted in the same way, namely, by screwing its shaft $c'$ into the grooved collar $X^3$, which is carried by the lever $c^{10}$, the face-plate being set out from the collar or moved toward it according as the shaft $c'$ is screwed into or from the collar. Both the shaft $c'$ and the rod $c^{20}$ are held after adjustment by setnuts. The raceways are made adjustable laterally in relation to each other upon the frame to provide for the wear of the saws by means of suitable slots through which the bolts fastening them to the frame extend. (See Fig. 2.)

The raceways are detachably secured to the framework in order that they may be removed and others of different sizes substituted to produce variations in the size of the bungs. It is not essential that the bung-strip feed devices be always employed, as previously-formed blanks may be fed to the chucks and operated upon by the edge-turning saws alone, and I would here say that instead of providing the chucks with a movement toward and from the edge-turning devices they may be provided with opening and closing movements only and not with the transferring movement, and that the movement of the edge-turning devices may be increased sufficiently to cause them to traverse by the edge or edges of the blank or blanks as thus held.

I would also say that the edge-turning devices may be stationary and the transfer movements of the chuck or chucks be increased sufficiently to cause the blanks to be presented during such movement or movements to the action of the non-traversing edge-turning saws or devices.

It is known to me that in a machine for producing corks a rotary "severing-knife" has been mounted in a vertical plane in connection with a "finishing-knife," which is arranged in a horizontal plane, and in connection with a feed-table which is arranged obliquely to the plane of the holding and severing devices. It is my belief, however, that I am the first to provide a bung-producing machine in which the feedway is arranged at a right angle with the blank-holding devices, and in which the severing device is arranged vertically, transversely of, and at a right angle with the feedway, and the first to produce a bung-making machine in which the feedway is at a right angle with the blank-strip-holding devices and both the rotary blank-severing device and the rotary trimming or edge shaping and finishing devices are arranged in a vertical plane at a right angle with the feedway.

Having thus fully described my invention, I claim and desire to secure by Letters Patent of the United States—

1. In a machine for making bungs and similar articles, the combination with a stationary raceway to receive a blank-strip; of a revoluble cutter which is movable either to the right or to the left transversely of the raceway, to sever a blank from the blank-strip; a rotary traveling chuck, coincident with the raceway, and receiving actuation from the main shaft of the machine, to receive the blank; and a revoluble edge-finishing device, concentric with the revoluble cutter, and similarly actuated, to act upon the bung-blank held by the chuck.

2. In a machine for making bungs and similar articles, the combination of parallel raceways, each having longitudinal recess $h$ and transverse recess $m$, extending across the raceway, as shown; a rotary cutter arranged intermediately and transversely of the raceways and movable edgewise into and out from the same; a rotary traveling chuck, to receive the bung-blanks directly from the raceway; and revoluble edge-finishing devices which are mounted in advance of the feedways, and in planes parallel with the rotary cutter; substantially as described.

3. In a machine for making bungs and similar articles, the combination of a stationary raceway which has a recess or way $h$, for a blank-strip or for a severed blank, and which has also a transverse recess $m$, and a front section or space which is adapted to receive a single blank; a rotary traveling chuck or blank-holder, coincident with the raceway; a revoluble shaft which is mounted upon a traveling support, and which is provided with a blank-severing cutter which is adapted to be engaged with the raceway, and which is provided also with rotary side or edge shaping devices; substantially as specified.

4. In a machine for making bungs, and similar articles, the combination of a stationary raceway which has a recess or way $h$, for a blank-strip or for a blank, and which has also a transverse recess $m$, for the operation of a cutter; a revoluble shaft, which is mounted upon a traveling support, which is provided with a blank-severing cutter which is adapted to the transverse recess in the raceway, and which is provided also with adjustable edge-shaping devices which are of dissimilar dimensions, as shown, so that various degrees of bevel or inclination may be formed upon the side or edge of the bung; substantially as specified.

5. In a machine for making bungs and similar articles, the ways M and M'; and the chucks or blank-holders C, and C', upon the shafts $c'$, $c'$; combined with the blank-cutter or saw B, and the edge-finishing saws B', upon the shaft $b^3$; substantially as and for the purposes set forth.

6. The combination in a machine for making bungs and similar articles, of a raceway the inner end of which is somewhat out of line with the main portion thereof, thereby providing the stop $m^{20}$; a stop $m^4$, at the end of the raceway; and a transferrer $m^3$, to move a blank from the first section of the raceway to the second; a cutter to sever the strip into blanks, movable transversely of the raceway, in front of said transferrer; edge-forming devices; and a chuck or blank-holder for engaging the blank while it is held in the offset section of the raceway, and presenting it to the action of edge-forming devices; as and for the purposes described.

7. The combination of the race or feed way of the machine; the movable blank-edge-forming devices, and the blank rotating and presenting chuck or holder, comprising the end face or stock $c^7$, its sliding head $c^8$, the face-plate $c^6$, the sliding rotary spindle or shaft $c'$, the lever $c^{10}$ pivoted as described, and connected with the sliding spindle $c'$; and a rod $c^{20}$, extending to the slide-block $c^8$; the spring $c^{21}$; and the cam to act against the arm $c^{12}$ of the lever; as and for the purposes described.

8. In a machine for making bungs and similar articles, the combination with the reciprocating rotary edge-shaper; of the end plates or sections of oppositely-placed blank-holders or chucks; the face-plates of such holders or chucks; and means, embracing band-wheels $c$ and $c^4$, belt $c^2$, and pulleys $c^3$, $c^3$, for imparting motion to the chucks.

9. The combination of the raceway M, M', having end offset, stops, and blank-transferrer, as specified; with the blank grasping, rotating and reciprocating chuck; the reciprocating severing-saw; and the edge-shaping devices; substantially as and for the purposes described.

10. In a machine for making bungs and similar articles, the combination of the shaft A, supported in the frame A', and provided with drums or band-wheels $b$ and $c$; the shaft $b^3$, mounted in the oscillating hanger $b^4$, carrying the blank-cutter B, and the edge-trimmers B', and provided with pulley $b^2$; the shafts $c'$, $c'$, carrying the chucks C and C', and each provided with pulley $c^3$; the raceway M, M', having end offset, stops, and blank-transferrer, as described, and the belts $b'$ and $c^2$, transferring motion, respectively, from the main shaft to the shafts $b^3$ and $c'$.

11. In a machine for making bungs and similar articles the combination of the shaft A, having band-wheels $b$ and $c$; the shaft $b^3$, mounted in the oscillating hanger $b^4$, carrying the blank-cutter B, and the edge-trimmers B', and provided with pulley $b^2$; the shafts $c'$, $c'$, carrying the chucks C, C', and each provided with pulley $c^3$; the belts $b'$ and $c^2$, transferring motion from the main shaft to the shafts $b^3$ and $c'$; the raceway M, M', having end offset, stops, and blank-transferrer, as set forth; and the cam-shaft D, receiving power from the shaft A, and provided with cams H, H', to cause reciprocation of the cutter, and of the edge-trimmers; to act upon the chuck, and permit it to be moved by an actuating-spring; and to actuate the strip from which the blanks are cut; substantially as and for the purposes specified.

12. The combination in a machine for making bungs and similar articles, of the main shaft, the rotary reciprocating chuck; the blank severing and shaping devices, positively rotated from the main shaft, and the blank-strip feed, the chuck closing and traveling mechanism, and the cutting and trimming and traveling mechanism, actuated by cams upon a separate shaft; both the severing devices and the trimming devices being mounted in a vertical plane, and a frictional connection between the main shaft and the cam-shaft; as and for the purposes described.

13. The combination in a machine for making bungs and the like, of two raceways or feedways; a strip-feeding mechanism for each feedway; a rotary blank receiving and transferring chuck or blank-holder, at the end of each feedway; and an intermediate traveling or reciprocating hanger or carriage, a saw or cutter mounted thereon, and an edge shaping or trimming device, also mounted thereon; the said cutter and shaping devices being alternately moved into operative relation with the two chucks; whereby blanks are alternately cut, and formed, by the same cutting and forming instrumentalities, during each movement thereof; as and for the purposes described.

14. In a machine for making bungs and similar articles, the combination of two parallel, horizontal feedways; a rotary blank holding and presenting chuck, at the end of each feedway; the shafts of the chucks being oppositely arranged, and nearly at a right angle with the feedways; and a single rotary, reciprocating, edge-shaping device, movable toward and from each chuck, as and for the purposes specified.

15. In a machine for making bungs and similar articles, the combination of two parallel, horizontal feedways; a rotary, reciprocating, blank-holding chuck, at the end of each feedway; and supported upon shafts which are arranged substantially at a right angle with the feedways, and a rotary, reciprocating, edge-shaping device, adapted, as described, to act upon and vary the configuration of the contact portion of the bung-blanks.

16. The combination in a machine for making bungs and similar articles, of two parallel open feedways; a rotary blank-edge-forming device; and the two rotary blank holding and presenting chucks, arranged with their faces opposite each other; the blank-holding chucks, and the blank-edge-forming device, being relatively movable, one in relation to the other, as described, whereby two previously-severed blanks are trimmed, in successive order, by the same edge-forming devices; as and for the purposes set forth.

17. The combination in a machine for making bungs and similar articles, of a reciprocating, rotary, blank-edge-trimming device; and two oppositely-placed rotary blank holding and presenting chucks, arranged face to face, as shown, and adapted to present the edges of the blanks to the action of the cutting or shaping mechanism, as it is moved past them alternately in either direction, and bearing a slight angular relation to the line of movement of the edge-trimming device; as and for the purposes described.

18. The combination in a machine for making bungs and similar articles, of the power-shaft A; the cam-shaft D; and the intermediate connections, comprising a smooth-surfaced roll $d$, upon the power-shaft; a loose band $d'$, or equivalent friction device, about the same; the smooth-edged wheel $d^2$, to engage the roll $d$, or friction-surface thereon; the pinion $d^5$, actuated by the roll $d^2$; and the gear $d^6$, upon the shaft D; substantially as specified.

19. The combination of the main shaft A, having the roll $d$; the cam-shaft D, having the gear $d^6$; and the hanger $d^4$, suspended from the cam-shaft D, and carrying the wheel $d^2$, and pinion $d^5$, and the spring $d^9$; substantially as described.

20. The combination of the main shaft A, having the roll $d$; the cam-shaft D, having the gear $d^6$; the hanger $d^4$, suspended from the cam-shaft D, and carrying the wheel $d^2$ and pinion $d^5$, the spring $d^9$ and lifting-latch $d^{10}$, and the lever $d^{11}$, for moving the hanger, and therefore the wheel $d^2$, from engagement with the roll $d$, and holding it separated therefrom; substantially as described and shown.

21. The combination of the raceway, having the offset at its end, as specified; the transferrer $m^3$; and an automatic transferrer-lifter; substantially as described.

22. The combination in a machine for making bungs and similar articles, of the parallel, transversely rectangular raceways M and M', each provided with a lateral severing-recess $m$; a depending freely-oscillating vertically and transversely arranged revoluble severing-saw, between the two raceways, and in coincidence with the recesses thereof; blank-holding chucks arranged at the end of the raceways, and at a right angle therewith; and vertically-arranged edge-finishing devices, mounted upon the suspended shaft or journal of the revoluble severing-saw, in advance of the discharging ends of the raceways; substantially as and for the purposes set forth.

23. In a machine for making bungs and similar articles, the combination with two stationary raceways, arranged substantially parallel to each other; of a cut-off saw, arranged at a point between the ends of the raceway; means for oscillating the cut-off so that it may act alternately upon the strips held by the respective raceways; a rotary blank-holding chuck, arranged at the inner end of each of the raceways, and with their longitudinal axes at an angle to the raceway; an edge-finishing device, located beyond the chucks; and means for oscillating said edge-finishing device, to bring it into engagement alternately with the blanks held by the respective chucks.

24. In a machine for making bungs and similar articles, the chuck-slide $c^8$, face-plate $c^7$ carried thereby; the rod $c^{20}$, its stops X, X$^2$, and the spring $c^{21}$; the lever $c^{10}$, and the face-plate $c^6$ and its shaft $c'$; all combined and arranged to operate substantially as and for the purposes described.

25. The combination of the depending, oscillatory edge-trimming devices, and the oppositely-placed chucks C and C', arranged nearly at a right angle with such trimming devices, and operatively connected with the described bent lever slide-rod, and related parts, whereby they are made adjustable in relation to such devices; substantially as and for the purposes described.

26. In a machine for making bungs and similar articles, the combination with the feedway or raceway of the machine, of the strip-engaging feed $g^2$, $g$ $g'$; lever $g^4$; spring $g^3$, connecting the lever with the holder $g^2$; the cam G; and the steady-rod $g^8$, carrying the returning-spring $g^9$.

27. In a machine for making bungs and similar articles, the combination of the described raceway, having the depression, lower section, or offset $m'$, at its end, as specified; the transferrer $m^3$, for moving the severed blanks into the lower section or offset portion of the ways; and the automatic transferrer-lifter or incline $o'$; substantially as set forth.

28. The combination with the rotary reciprocating shaft $c'$, and its chuck C or C', having head-stock $c^6$; of the tail-stock or face-plate $c^7$, carried by the block $c^8$, and adapted to be rotated therein; substantially as described.

EDWARD E. ELDER.

Witnesses:
F. F. RAYMOND, 2d,
J. M. DOLAN.